(12) United States Patent
Shah et al.

(10) Patent No.: US 11,582,064 B1
(45) Date of Patent: Feb. 14, 2023

(54) SECURE ETHERNET AND TRANSMISSION CONTROL PROTOCOL

(71) Applicant: GM Cruise Holdings LLC, San Francisco, CA (US)

(72) Inventors: Shakti Shah, San Jose, CA (US); Victor Wang, San Diego, CA (US); Deepti Varshney, San Francisco, CA (US); Jordan Ruderman, Pacifica, CA (US); Ashwin Raut, Cupertino, CA (US); Stephen Williams, Oakland, CA (US); Guy Erb, San Francisco, CA (US)

(73) Assignee: GM Cruise Holdings LLC., San Francisco, CA (US)

( * ) Notice: Subject to any disclaimer, the term of this patent is extended or adjusted under 35 U.S.C. 154(b) by 15 days.

(21) Appl. No.: 17/387,101

(22) Filed: Jul. 28, 2021

(51) Int. Cl.
| | |
|---|---|
| *H04L 29/08* | (2006.01) |
| *H04L 12/44* | (2006.01) |
| *H04L 67/12* | (2022.01) |
| *H04L 12/40* | (2006.01) |

(52) U.S. Cl.
CPC ............ *H04L 12/44* (2013.01); *H04L 12/40* (2013.01); *H04L 67/12* (2013.01); *H04L 2012/40215* (2013.01); *H04L 2012/445* (2013.01)

(58) Field of Classification Search
CPC ......... H04L 12/44; H04L 12/40; H04L 67/12; H04L 2012/40215; H04L 2012/445
See application file for complete search history.

(56) References Cited

U.S. PATENT DOCUMENTS

| | | | |
|---|---|---|---|
| 2019/0258251 A1* | 8/2019 | Ditty | ............... G06V 20/58 |
| 2021/0192867 A1* | 6/2021 | Fang | .................. G07C 5/008 |
| 2022/0144211 A1* | 5/2022 | Lee | ................ B60R 25/2072 |

\* cited by examiner

*Primary Examiner* — Kim T Nguyen
(74) *Attorney, Agent, or Firm* — Polsinelli PC

(57) ABSTRACT

Methods and systems are provided for providing secure Ethernet transmissions. In some aspects, an autonomous vehicle system is provided and can include a first system-on-chip being configured to provide data to a second system-on-chip via an Ethernet harness, a first switch being configured to: receive the data from the first system-on-chip, and provide the data to a first transceiver for transmission to the second system-on-chip, the first switch being configured to provide first transmission data to the first transceiver and to prohibit receipt of retrieval data from the second system-on-chip, and the first transceiver configured to communicate with the second system-on-chip via the Ethernet harness.

20 Claims, 5 Drawing Sheets

SECURE ETHERNET AND TRANSMISSION CONTROL PROTOCOL

BACKGROUND

1. Technical Field

The subject technology provides solutions for autonomous vehicles, and in particular, for providing secure Ethernet transmissions.

2. Introduction

Autonomous vehicles are vehicles having computers and control systems that perform driving and navigation tasks that are conventionally performed by a human driver. As autonomous vehicle technologies continue to advance, ride-sharing services will increasingly utilize autonomous vehicles to improve service efficiency and safety. However, autonomous vehicles will be required to perform many of the functions that are conventionally performed by human drivers, such as avoiding dangerous or difficult routes, and performing other navigation and routing tasks necessary to provide safe and efficient transportation. Such tasks may require the collection and processing of large quantities of data disposed on the autonomous vehicle.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Figure 1:
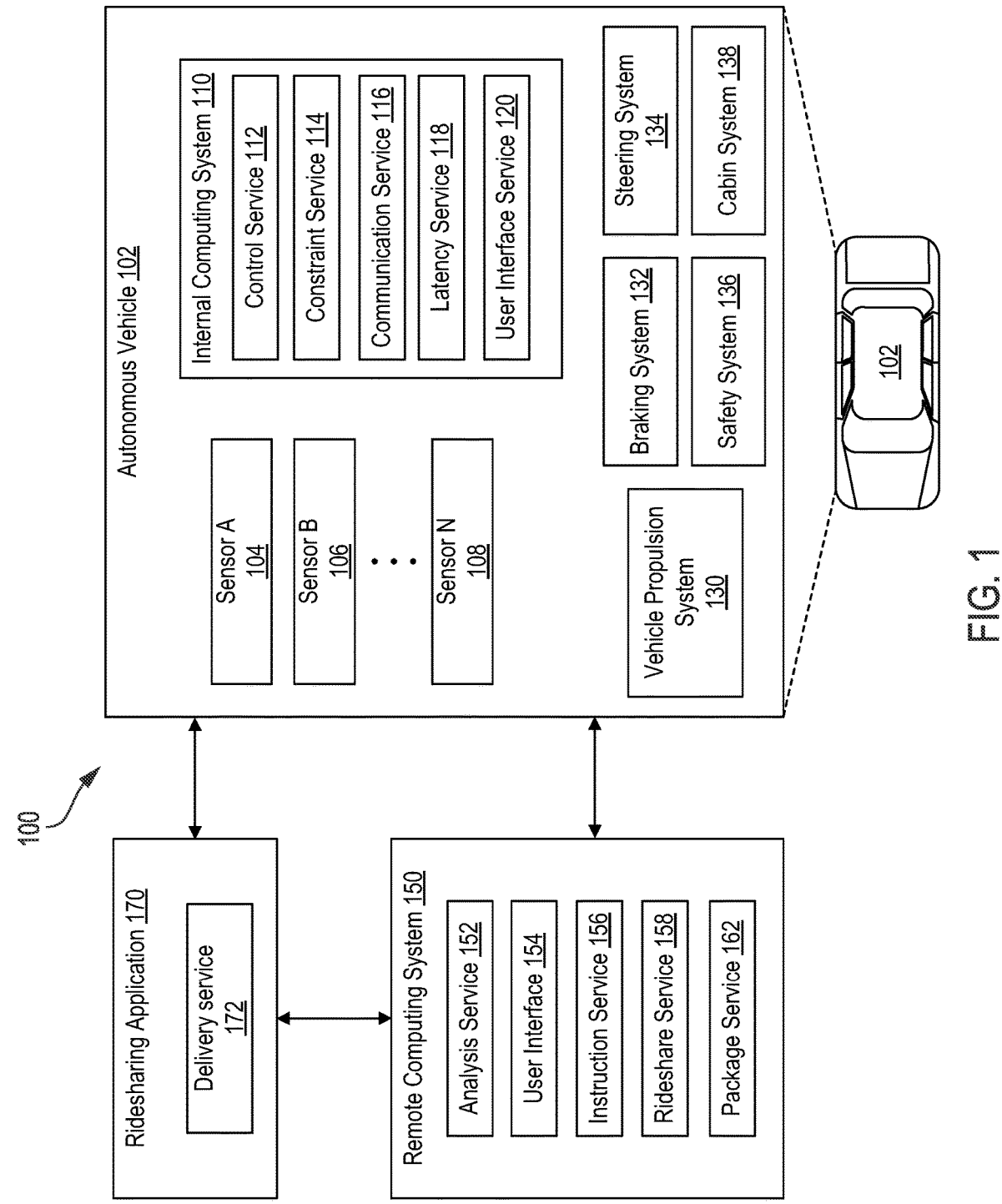
FIG. 1 illustrates an example system environment that can be used to facilitate autonomous vehicle navigation and routing operations, according to some aspects of the disclosed technology.

FIG. 1 illustrates an example system environment 100 that can be used to facilitate AV dispatch and operations, according to some aspects of the disclosed technology. Autonomous vehicle 102 can navigate about roadways without a human driver based upon sensor signals output by sensor systems 104-106 of autonomous vehicle 102. Autonomous vehicle 102 includes a plurality of sensor systems 104-106 (a first sensor system 104 through an Nth sensor system 106). Sensor systems 104-106 are of different types and are arranged about the autonomous vehicle 102. For example, first sensor system 104 may be a camera sensor system and the Nth sensor system 106 may be a Light Detection and Ranging (LIDAR) sensor system. Other exemplary sensor systems include radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems such as Global Positioning System (GPS) receiver systems, accelerometers, gyroscopes, inertial measurement units (IMU), infrared sensor systems, laser rangefinder systems, ultrasonic sensor systems, infrasonic sensor systems, microphones, or a combination thereof. While four sensors 180 are illustrated coupled to the autonomous vehicle 102, it is understood that more or fewer sensors may be coupled to the autonomous vehicle 102.

Autonomous vehicle 102 further includes several mechanical systems that are used to effectuate appropriate motion of the autonomous vehicle 102. For instance, the mechanical systems can include but are not limited to, vehicle propulsion system 130, braking system 132, and steering system 134. Vehicle propulsion system 130 may include an electric motor, an internal combustion engine, or both. The braking system 132 can include an engine brake, brake pads, actuators, and/or any other suitable componentry that is configured to assist in decelerating autonomous vehicle 102. In some cases, braking system 132 may charge a battery of the vehicle through regenerative braking. Steering system 134 includes suitable componentry that is configured to control the direction of movement of the autonomous vehicle 102 during navigation.

Autonomous vehicle 102 further includes a safety system 136 that can include various lights and signal indicators, parking brake, airbags, etc. Autonomous vehicle 102 further includes a cabin system 138 that can include cabin temperature control systems, in-cabin entertainment systems, etc.

Autonomous vehicle 102 additionally comprises an internal computing system 110 that is in communication with sensor systems 180 and systems 130, 132, 134, 136, and 138. Internal computing system 110 includes at least one processor and at least one memory having computer-executable instructions that are executed by the processor. The computer-executable instructions can make up one or more services responsible for controlling autonomous vehicle 102, communicating with remote computing system 150, receiving inputs from passengers or human co-pilots, logging metrics regarding data collected by sensor systems 180 and human co-pilots, etc.

Internal computing system 110 can include a control service 112 that is configured to control operation of vehicle propulsion system 130, braking system 132, steering system 134, safety system 136, and cabin system 138. Control service 112 receives sensor signals from sensor systems 180 as well communicates with other services of internal computing system 110 to effectuate operation of autonomous vehicle 102. In some embodiments, control service 112 may carry out operations in concert one or more other systems of autonomous vehicle 102.

Internal computing system 110 can also include constraint service 114 to facilitate safe propulsion of autonomous vehicle 102. Constraint service 116 includes instructions for activating a constraint based on a rule-based restriction upon operation of autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of control service 112.

The internal computing system 110 can also include communication service 116. The communication service 116 can include both software and hardware elements for transmitting and receiving signals from/to the remote computing system 150. Communication service 116 is configured to transmit information wirelessly over a network, for example, through an antenna array that provides connectivity using one or more cellular transmission standards, such as long-term evolution (LTE), 3G, 5G, or the like.

In some embodiments, one or more services of the internal computing system 110 are configured to send and receive communications to remote computing system 150 for such reasons as reporting data for training and evaluating machine learning algorithms, requesting assistance from remoting computing system or a human operator via remote computing system 150, software service updates, ridesharing pickup and drop off instructions etc.

Internal computing system 110 can also include latency service 118. Latency service 118 can utilize timestamps on communications to and from remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, latency service 118 can enable other systems of autonomous vehicle 102 or a passenger to make necessary decisions or to provide the needed feedback.

Internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

As described above, the remote computing system 150 is configured to send/receive a signal from the autonomous vehicle 140 regarding reporting data for training and evaluating machine learning algorithms, requesting assistance from remote computing system 150 or a human operator via the remote computing system 150, software service updates, rideshare pickup and drop off instructions, etc.

Remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

Remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

Remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

Remote computing system 150 can also include rideshare service 158 configured to interact with ridesharing applications 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle to 102 go around an obstacle, change routes, honk the horn, etc.

As described herein, one aspect of the present technology is to provide an autonomous vehicle system that can provide secure Ethernet transmissions. The present disclosure contemplates that in some instances, the transmission connections between a switch and a transceiver can be configured in a way to prevent malicious actors from gaining access to the autonomous vehicle system.

Currently, malicious actors can gain access to a telematics and network gateway (TANG) board via a customer facing WIFI module (CFWM) board. For example, the malicious actor can gain access (e.g., via WIFI) and send malicious code, instructions, data, etc. through the CFWM board and to the TANG board. As long as the malicious actor has "approved" access to join the WIFI connection, the malicious actor can hack into the autonomous vehicle system because the TANG board is continuously receiving data from the CFWM board.

Aspects of the disclosed technology address the foregoing limitations of conventional transmission connections within an autonomous vehicle system by providing secure Ethernet transmission throughout the autonomous vehicle system.

As discussed in further detail below, an autonomous vehicle system is provided that can provide secure Ethernet transmissions. The autonomous vehicle system can include a first system-on-chip being configured to provide data to a second system-on-chip via an Ethernet harness, a first switch being configured to: receive the data from the first system-on-chip, and provide the data to a first transceiver for transmission to the second system-on-chip, the first switch being configured to only provide first transmission data to the first transceiver to prohibit receipt of retrieval data from the second system-on-chip, and the first transceiver being configured to communicate with the second system-on-chip via the Ethernet harness.

Figure 2A:
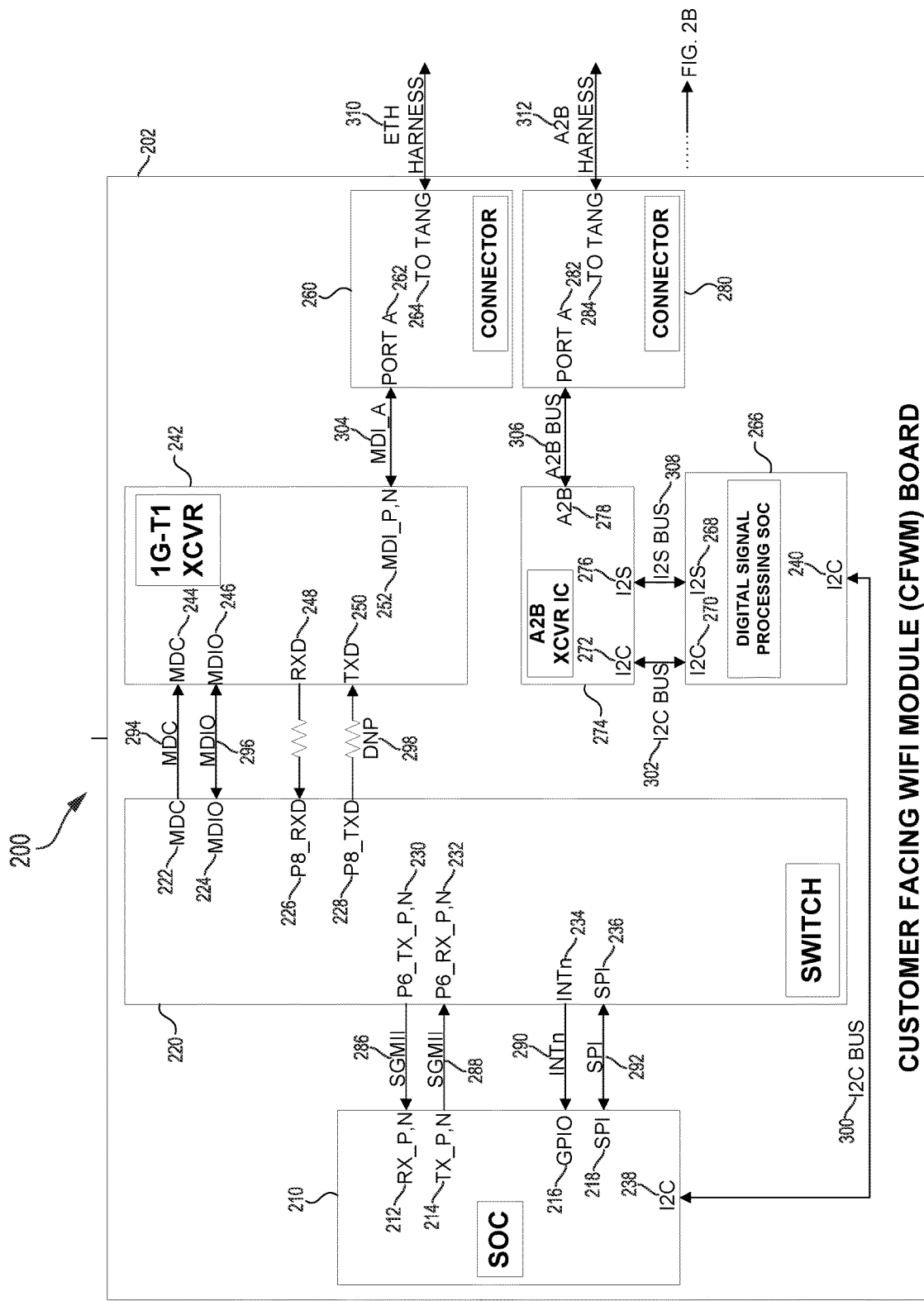
FIG. 2A illustrates an example customer facing WIFI module board of a transmission system, according to some aspects of the disclosed technology.

FIG. 2A illustrates an example customer facing WIFI module (CFWM) board 202 of a transmission system 200, according to some aspects of the disclosed technology. In some embodiments, the CFWM board 202 of the transmission system 200 can include a system-on-chip (SOC) 210, a switch 220, a transceiver ("XCVR") 242, a connector 260, and an Ethernet harness 310. The system-on-chip 202 of the CFWM board 202 can be an integrated circuit that integrates computer components and electronic systems such as a central processing unit (CPU), memory, input/output ports, graphics processing unit (GPU), and radio modems (e.g., WIFI, Bluetooth, etc.). Referring to FIG. 2A, the system-on-chip 210 can include input/output ports such as a receive, positive/negative port ("RX_P,N") 212, a transmit, positive/negative port ("TX_P,N") 214, a general purpose input/output port ("GPIO") 216, a serial peripheral interface (SPI) 218, and an Inter-Integrated Circuit ("I2C") port 238.

The switch 220 of the transmission system 200 can include a low port configuration and a high port configuration that can support Ethernet connectivity such as 100BASE-T1 and 1000BASE-T1 Ethernet. The switch 220 can further be a high speed switch system that can include packet buffers, Ethernet physical layer transceivers ("PHY"), media access controllers (MAC), address management, a packet processor, a port-based rate control, and any other feature suitable for the intended purpose and understood by a person of ordinary skill in the art. As the DNP connections 298, 402 can result in a 1-way Ethernet connection, the switches 220, 330 can include firmware that supports customized features such as IEEE 802.1 and 802.3 protocols. Enablement of features such as static Address Resolution Protocol (ARP) tables can allow the switches 220, 330, in conjunction with the SOCs 210, 320, to support Ethernet datagram traffic. The switch 220 of the transmission system 200 can include input/output ports such as management data input/output (MDIO) 224, MDIO interface clock ("MDC") 222, a receive port ("P8_RXD") 226, a transmit port ("P8_TXD") 228, a transmit port ("P6_TX_P, N") 230, a receive port ("P6_RX_P,N") 232, an interrupt interface ("INTn") 234, and an SPI 236.

The transceiver 242 of the transmission system 200 can be a 1 gigabit Ethernet/T1 transceiver and include input/output ports such as MDC 244, MDIO 246, a receive port ("RXD") 248, a transmit port ("TXD") 250, and a medium dependent interface (MDI) positive/negative port ("MDI_P,N") 252.

The connector 260 of the transmission system 200 can include input/output ports such as port A 262 and a port to another system 264 (e.g., to a telematics and network gateway (TANG) board 314). For example, the port 264 can connect the transceiver 242 of the CFWM board 202 to the TANG board 314 via the Ethernet harness 310. In some implementations, the Ethernet harness 310 can be a one-way Ethernet connection. For example, the Ethernet harness 310 can facilitate communications from the TANG board 314 to the CFWM board 202, and not from the CFWM board 202 to the TANG board 314.

In other embodiments, the CFWM board 202 of the transmission system 200 can further include a digital signal processing system-on-chip (SOC) 266, an automotive audio bus ("A2B") transceiver ("XCVR") integrated circuit (IC) 274, and a connector 280. The digital signal processing system-on-chip 266 of the transmission system 200 can include ports such as I2C ports 240, 270, and an inter-IC sound ("I2S") interface 268.

The automotive audio bus transceiver integrated circuit 274 of the transmission system 200 can be a high bandwidth, bi-directional digital audio bus and include ports such as an I2S 276, and an A2B 278. In some implementations, the automotive audio bus transceiver integrated circuit 274 of the transmission system 200 can provide controlled receipt information (e.g., feedback and acknowledgment data) to the TANG board 314. For example, the controlled receipt information can be provided along a return path from the system-on-chip 210 to the system-on-chip 320. In some examples, the return path of the automotive audio bus transceiver integrated circuit 274 can be more filtered and secure/trustworthy than the path utilized by the transceiver 242 of the CFWM board 202.

The connector 280 of the transmission system 200 can include input/output ports such as port A 282 and a port to another system 284 (e.g., to the TANG board 314). For example, the port 284 can connect the A2B transceiver 274 of the CFWM board 202 to the TANG board 314 via an A2B harness 312.

In some examples, the various components of the CFWM board 202 can be communicatively coupled to each other. For example, the system-on-chip 210 can be connected to the switch 220 with connections such as: RX_P,N 212 being connected to P6_TX_P,N 230 via a serial gigabit media independent interface (SGMII) 286, TX_P,N 214 being connected to P6_RX_P,N 232 via an SGMII 288, GPIO 216 being connected to INTn 234 via INTn 290, and SPI 218 being connected to SPI 236 via SPI 292.

The switch 220 of the CFWM board 202 can be connected to the transceiver 242 with connections such as: MDC 222 being connected to MDC 244 via MDC 294, MDIO 224 being connected to MDIO 246 via MDIO 296, and P8_RXD 226 being connected to RXD 248. The connection between P8_TXD 228 of the switch 220 and TXD 250 of the transceiver 242 can be prohibited or limited including a "do not populate" policy 298. For example, there may be no physical connection between the P8_TXD 228 of the switch 220 and TXD 250 of the transceiver 242. In other examples, the switch 220 and/or the transceiver 242 can be configured to prohibit data and information to pass from the switch 220 to the transceiver 242 (e.g., between P8_TXD 228 of the switch 220 and TXD 250 of the transceiver 242). By doing so, in these examples, hackers or individuals cannot transmit malicious data (e.g., code, instructions, information, etc.) from the CFWM board 202 to the TANG board 314 via the connection between the P8_TXD 228 of the switch 220 and TXD 250 of the transceiver 242. For example, during PCB fabrication, the DNP 298, 402 can be used to designate components that are not to be populated on the CFWM board 202 and the TANG board 314, thereby ensuring a modular design with a distinctive behavior for Ethernet routing.

The transceiver 242 of the CFWM board 202 can be connected to the connector 260 with connections such as: MDI_P,N 252 being connected to Port A 262 via MDI_A 304.

The digital signal processing system-on-chip 266 of the CFWM board 202 can be connected to the automotive audio bus transceiver integrated circuit ("A2B XCVR IC") 274 with connections such as I2S 268 being connected to I2S 276 via I2S bus 308 and I2C 270 being connected to I2C 272 via I2C bus 302. The digital signal processing system-on-chip 266 of the CFWM board 202 can also be connected to the SOC 210 with connections such as I2C 240 being connected to I2C 238 via I2C bus 300.

The automotive audio bus transceiver integrated circuit 274 of the CFWM board 202 can be connected to the connector 280 with connections such as A2B 278 being connected to Port A 282 via A2B bus 306.

Figure 2B:
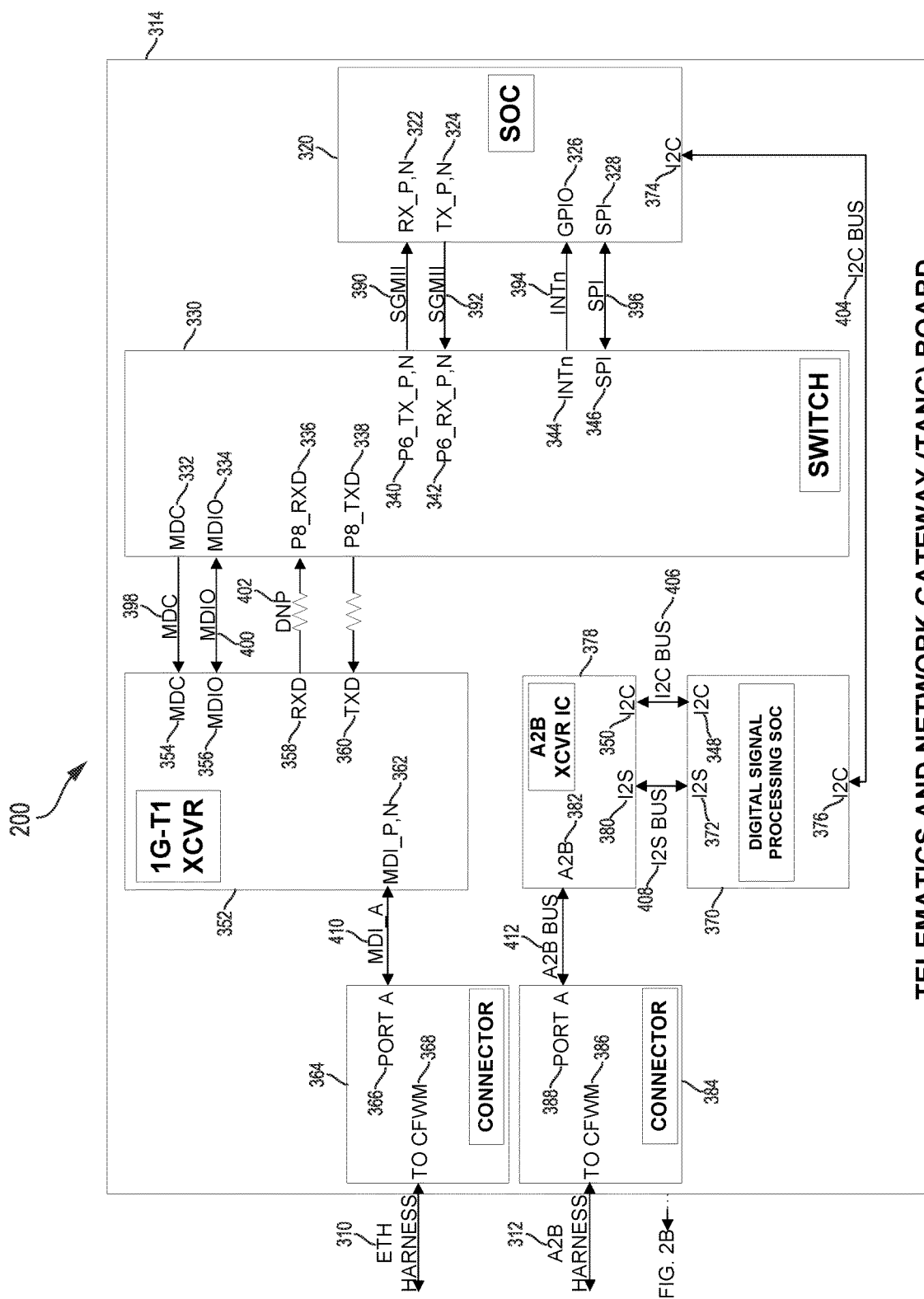
FIG. 2B illustrates an example telematics and network gateway board of a transmission system, according to some aspects of the disclosed technology.

FIG. 2B illustrates an example telematics and network gateway (TANG) board 314 of the transmission system 200, according to some aspects of the disclosed technology. In some embodiments, the TANG board 314 of the transmission system 200 can include a system-on-chip (SOC) 320, a switch 330, a transceiver ("XCVR") 352, a connector 364, and the Ethernet harness 310. The system-on-chip 320 of the TANG board 314 can be an integrated circuit that integrates computer components and electronic systems such as a central processing unit (CPU), memory, input/output ports, graphics processing unit (GPU), and radio modems (e.g., WIFI, Bluetooth, etc.). Referring to FIG. 2B, the system-on-chip 320 can include input/output ports such as a receive, positive/negative port ("RX_P,N") 322, a transmit, positive/negative port ("TX_P,N") 324, a general purpose input/output port ("GPIO") 326, a serial peripheral interface (SPI) 328, and an Inter-Integrated Circuit ("I2C") port 374.

The switch 330 of the transmission system 200 can include a low port configuration and a high port configuration that can support Ethernet connectivity such as 100BASE-T1 and 1000BASE-T1 Ethernet. The switch 330 can further be a high speed switch system that can include packet buffers, Ethernet physical layer transceivers ("PHY"), media access controllers (MAC), address management, a packet processor, a port-based rate control, and any other feature suitable for the intended purpose and understood by a person of ordinary skill in the art. The switch 330 of the transmission system 200 can include input/output ports such as management data input/output (MDIO) 334, MDIO interface clock ("MDC") 332, a receive port ("P8_RXD") 336, a transmit port ("P8_TXD") 338, a transmit port ("P6_TX_P,N") 340, a receive port ("P6_RX_P,N") 342, an interrupt interface ("INTn") 344, and an SPI 346.

The transceiver 352 of the transmission system 200 can be a 1 gigabit Ethernet/T1 transceiver and include input/output ports such as MDC 354, MDIO 356, a receive port ("RXD") 358, a transmit port ("TXD") 360, and a medium dependent interface (MDI) positive/negative port ("MDI_P,N") 362.

The connector 364 of the transmission system 200 can include input/output ports such as port A 366 and a port to another system 368 (e.g., to the CFWM board 202). For example, the port 368 can connect the transceiver 352 of the TANG board 314 to the CFWM board 202 via the Ethernet harness 310.

In other embodiments, the TANG board 314 of the transmission system 200 can further include a digital signal processing system-on-chip (SOC) 370, an automotive audio bus ("A2B") transceiver ("XCVR") integrated circuit (IC) 378, and a connector 384. The digital signal processing system-on-chip 370 of the transmission system 200 can include ports such as I2C ports 348, 376 and an inter-IC sound ("I2S") interface 372.

The automotive audio bus transceiver integrated circuit 378 of the transmission system 200 can be a high bandwidth, bi-directional digital audio bus and include ports such as an I2S 380, and an A2B 382.

The connector 384 of the transmission system 200 can include input/output ports such as port A 388 and a port to another system 386 (e.g., to the CFWM board 202). For example, the port 386 can connect the A2B transceiver 378 of the TANG board 314 to the CFWM board 202 via the A2B harness 312.

In some examples, the various components of the TANG board 314 can be communicatively coupled to each other. For example, the system-on-chip 320 can be connected to the switch 330 with connections such as: RX_P,N 322 being connected to P6_TX_P,N 340 via a serial gigabit media independent interface (SGMII) 390, TX_P,N 324 being connected to P6_RX_P,N 342 via an SGMII 392, GPIO 326 being connected to INTn 344 via INTn 394, and SPI 328 being connected to SPI 346 via SPI 396.

The switch 330 of the TANG board 314 can be connected to the transceiver 352 with connections such as: MDC 332 being connected to MDC 354 via MDC 398, MDIO 334 being connected to MDIO 356 via MDIO 400, and P8_TXD 338 being connected to TXD 360. The connection between P8_RXD 336 of the switch 330 and RXD 358 of the transceiver 352 can be prohibited or limited including a "do not populate" policy 402. For example, there may be no physical connection between the P8_RXD 336 of the switch 330 and RXD 358 of the transceiver 352. In other examples, the switch 330 and/or the transceiver 352 can be configured to prohibit data and information to pass from the transceiver 352 to the switch 330 (e.g., between RXD 358 of the transceiver 352 and P8_RXD 336 of the switch 330). By doing so, in these examples, hackers or individuals cannot transmit malicious data (e.g., code, instructions, information, etc.) from the CFWM board 202 to the TANG board 314 via the connection between the RXD 358 of the transceiver 352 and P8_RXD 336 of the switch 330.

The transceiver 352 of the TANG board 314 can be connected to the connector 364 with connections such as: MDI_P,N 362 being connected to Port A 366 via MDI_A 410.

The digital signal processing system-on-chip 370 of the TANG board 314 can be connected to the automotive audio bus transceiver integrated circuit ("A2B XCVR IC") 378 with connections such as I2S 372 being connected to I2S 380 via I2S bus 408 and I2C 348 being connected to I2C 350 via I2C bus 406. The digital signal processing system-on-chip 370 of the TANG board 314 can also be connected to the SOC 320 with connections such as I2C 376 being connected to I2C 374 via I2C bus 404.

The automotive audio bus transceiver integrated circuit 378 of the TANG board 314 can be connected to the connector 384 with connections such as A2B 382 being connected to Port A 388 via A2B bus 412.

Figure 3:
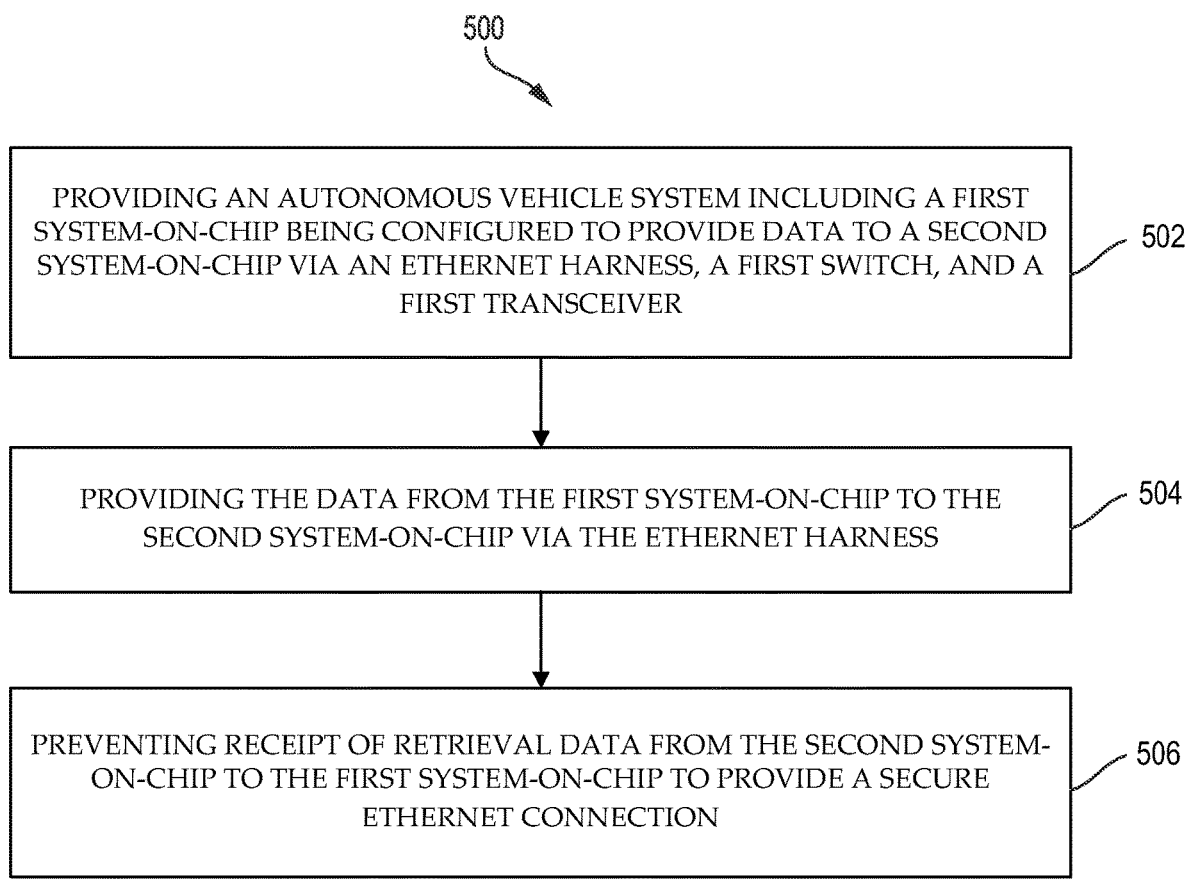
FIG. 3 illustrates an example process of providing secure Ethernet transmissions, according to some aspects of the disclosed technology.

Having disclosed some example system components and concepts, the disclosure now turns to FIG. 3, which illustrates an example method 500 for providing secure Ethernet transmissions. The steps outlined herein are exemplary and can be implemented in any combination thereof, including combinations that exclude, add, or modify certain steps.

At step 502, method 500 can include providing an autonomous vehicle system comprising: a first system-on-chip being configured to provide data to a second system-on-chip via an Ethernet harness; a first switch being configured to: receive the data from the first system-on-chip; and provide the data to a first transceiver for transmission to the second system-on-chip, the first switch being configured to provide first transmission data to the first transceiver and to prohibit receipt of retrieval data from the second system-on-chip; and the first transceiver being configured to communicate with the second system-on-chip via the Ethernet harness.

In some implementations, the first switch can include a transmit connection line with the first transceiver that prohibits the receipt of the retrieval data. In other implementations, the first switch can exclude a receive connection line with the first transceiver to prohibit the receipt of the retrieval data.

At step 504, method 500 can include providing the data from the first system-on-chip to the second system-on-chip via the Ethernet harness.

At step 506, method 500 can include preventing the receipt of the retrieval data from the second system-on-chip to the first system-on-chip to provide a secure Ethernet connection.

In other implementations, the autonomous vehicle system can further comprise a first connector that is configured to communicatively couple the first transceiver and the second system-on-chip.

In one example, the autonomous vehicle system can further include: a first digital signal processing system-on-chip that is communicatively coupled to the first system-on-chip; and a first automotive audio bus ("A2B") transceiver that is configured to communicatively couple the first digital signal processing system-on-chip and the second system-on-chip. The first system-on-chip and the first digital signal processing system-on-chip can be configured to communicate over a bus interface, the first system-on-chip being configured to provide second transmission data to the first digital signal processing system-on-chip via the bus interface and to prohibit receipt of data from the first digital signal processing system-on-chip.

In some implementations, the autonomous vehicle system further can include: the second system-on-chip being configured to receive the data from the first system-on-chip via the Ethernet harness, a second switch being configured to: receive the data from the first system-on-chip via a second transceiver, and provide the data received from the second transceiver to the second system-on-chip, the second switch being configured to receive the first transmission data from the second transceiver and to prohibit transmission of additional transmit data to the first system-on-chip, and the second transceiver being configured to communicate with first system-on-chip via the Ethernet harness.

In some examples, the second switch can include a receive connection line with the second transceiver that prohibits the transmission of the additional transmit data. In other examples, the second switch can exclude a transmit connection line with the second transceiver to prohibit the transmission of the additional transmit data.

The method 500 can further include excluding, by the first switch, the retrieval data received from the first transceiver.

Figure 4:
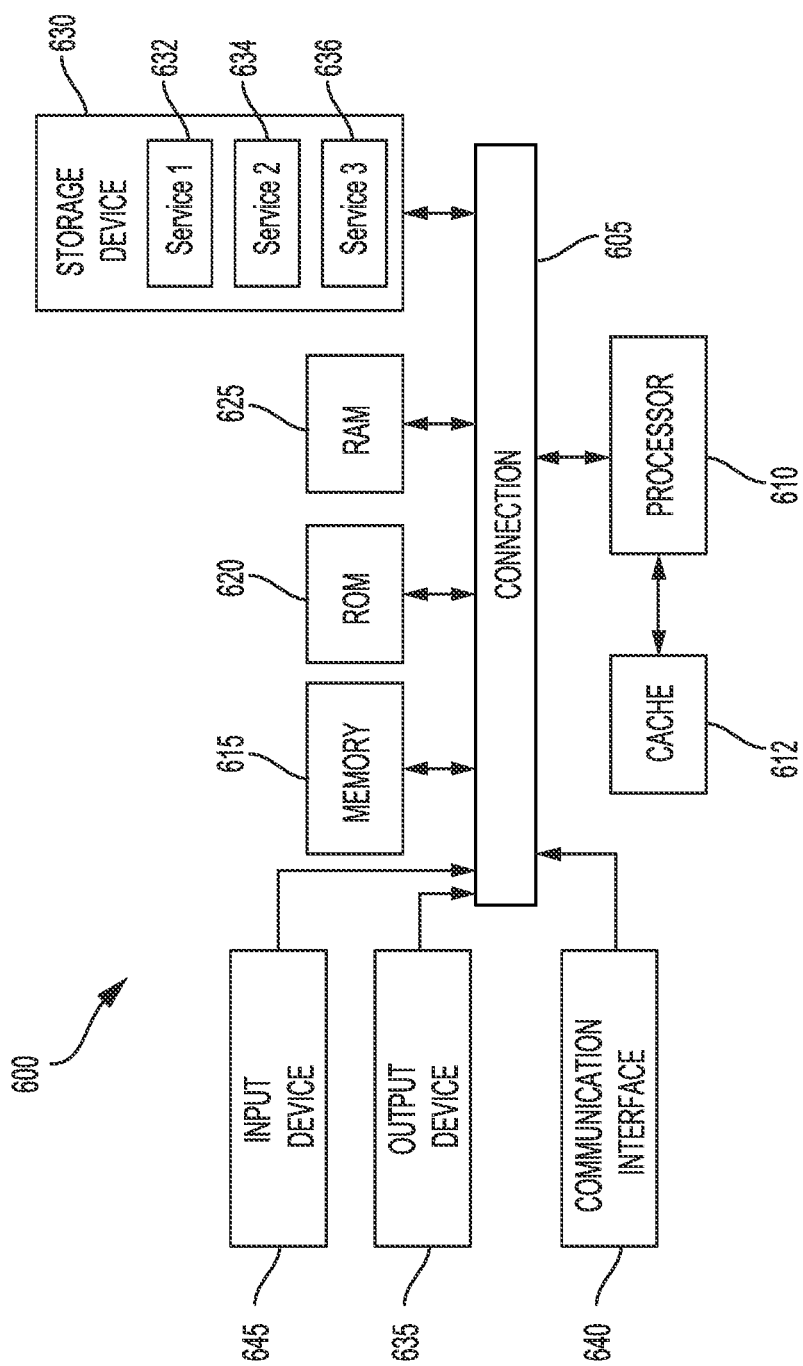
FIG. 4 illustrates an example processor-based system with which some aspects of the subject technology can be implemented.

FIG. 4 illustrates an example processor-based system with which some aspects of the subject technology can be implemented. For example, processor-based system 600 that can be any computing device making up internal computing system 110, remote computing system 150, a passenger device executing the rideshare app 170, internal computing device 130, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read-only memory (ROM) 620 and random-access memory (RAM) 625 to processor 610. Computing system 600 can include a cache of high-speed memory 612 connected directly with, in close proximity to, and/or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

Storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. By way of example computer-executable instructions can be used to implement perception system functionality for determining when sensor cleaning operations are needed or should begin. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. An autonomous vehicle system for providing secure Ethernet transmissions, the autonomous vehicle system comprising:
   a first system-on-chip being configured to provide data to a second system-on-chip via an Ethernet harness;
   a first switch being configured to:
      receive the data from the first system-on-chip; and
      provide the data to a first transceiver for transmission to the second system-on-chip, the first switch being configured to provide first transmission data to the first transceiver and to prohibit receipt of retrieval data from the second system-on-chip; and
the first transceiver being configured to communicate with the second system-on-chip via the Ethernet harness.

2. The autonomous vehicle system of claim 1, wherein the first switch includes a transmit connection line with the first transceiver that prohibits the receipt of the retrieval data.

3. The autonomous vehicle system of claim 1, wherein the first switch excludes a receive connection line with the first transceiver to prohibit the receipt of the retrieval data.

4. The autonomous vehicle system of claim 1, wherein the first switch comprises:
one or more processors; and
at least one computer-readable storage medium having stored therein instructions which, when executed by the one or more processors, cause the first switch to exclude the retrieval data received from the first transceiver.

5. The autonomous vehicle system of claim 1, further comprising a first connector being configured to communicatively couple the first transceiver and the second system-on-chip.

6. The autonomous vehicle system of claim 1, further comprising:
a first digital signal processing system-on-chip being communicatively coupled to the first system-on-chip; and
a first automotive audio bus ("A2B") transceiver being configured to communicatively couple the first digital signal processing system-on-chip and the second system-on-chip.

7. The autonomous vehicle system of claim 6, wherein the first system-on-chip and the first digital signal processing system-on-chip are configured to communicate over a bus interface, the first system-on-chip being configured to provide second transmission data to the first digital signal processing system-on-chip via the bus interface and to prohibit receipt of data from the first digital signal processing system-on-chip.

8. The autonomous vehicle system of claim 1, further comprising:
the second system-on-chip being configured to receive the data from the first system-on-chip via the Ethernet harness;
a second switch being configured to:
receive the data from the first system-on-chip via a second transceiver; and
provide the data received from the second transceiver to the second system-on-chip, the second switch being configured to receive the first transmission data from the second transceiver and to prohibit transmission of additional transmit data to the first system-on-chip; and
the second transceiver being configured to communicate with first system-on-chip via the Ethernet harness.

9. The autonomous vehicle system of claim 8, wherein the second switch includes a receive connection line with the second transceiver that prohibits the transmission of the additional transmit data.

10. The autonomous vehicle system of claim 8, wherein the second switch excludes a transmit connection line with the second transceiver to prohibit the transmission of the additional transmit data.

11. A method for providing secure Ethernet transmissions, the method comprising:
providing an autonomous vehicle system comprising:
a first system-on-chip being configured to provide data to a second system-on-chip via an Ethernet harness;
a first switch being configured to:
receive the data from the first system-on-chip; and
provide the data to a first transceiver for transmission to the second system-on-chip, the first switch being configured to provide first transmission data to the first transceiver and to prohibit receipt of retrieval data from the second system-on-chip; and
the first transceiver being configured to communicate with the second system-on-chip via the Ethernet harness;
providing the data from the first system-on-chip to the second system-on-chip via the Ethernet harness; and
preventing the receipt of the retrieval data from the second system-on-chip to the first system-on-chip to provide a secure Ethernet connection.

12. The method of claim 11, wherein the first switch includes a transmit connection line with the first transceiver that prohibits the receipt of the retrieval data.

13. The method of claim 11, wherein the first switch excludes a receive connection line with the first transceiver to prohibit the receipt of the retrieval data.

14. The method of claim 11, further comprising excluding, by the first switch, the retrieval data received from the first transceiver.

15. The method of claim 11, wherein the autonomous vehicle system further comprises a first connector being configured to communicatively couple the first transceiver and the second system-on-chip.

16. The method of claim 11, wherein the autonomous vehicle system further comprises:
a first digital signal processing system-on-chip being communicatively coupled to the first system-on-chip; and
a first automotive audio bus ("A2B") transceiver being configured to communicatively couple the first digital signal processing system-on-chip and the second system-on-chip.

17. The method of claim 16, wherein the first system-on-chip and the first digital signal processing system-on-chip are configured to communicate over a bus interface, the first system-on-chip being configured to provide second transmission data to the first digital signal processing system-on-chip via the bus interface and to prohibit receipt of data from the first digital signal processing system-on-chip.

18. The method of claim 11, wherein the autonomous vehicle system further comprises:
the second system-on-chip being configured to receive the data from the first system-on-chip via the Ethernet harness;
a second switch being configured to:
receive the data from the first system-on-chip via a second transceiver; and
provide the data received from the second transceiver to the second system-on-chip, the second switch being configured to receive the first transmission data from the second transceiver and to prohibit transmission of additional transmit data to the first system-on-chip; and
the second transceiver being configured to communicate with first system-on-chip via the Ethernet harness.

19. The method of claim 18, wherein the second switch includes a receive connection line with the second transceiver that prohibits the transmission of the additional transmit data.

20. The method of claim 18, wherein the second switch excludes a transmit connection line with the second transceiver to prohibit the transmission of the additional transmit data.

\* \* \* \* \*